(12) United States Patent
Bareli

(10) Patent No.: US 8,207,939 B1
(45) Date of Patent: Jun. 26, 2012

(54) SQUEEZABLE COMPUTER MOUSE

(76) Inventor: Bezalel Sol Bareli, Woodmere, NY (US)

( * ) Notice: Subject to any disclaimer, the term of this patent is extended or adjusted under 35 U.S.C. 154(b) by 1107 days.

(21) Appl. No.: 12/102,988

(22) Filed: Apr. 15, 2008

Related U.S. Application Data

(63) Continuation-in-part of application No. 11/755,058, filed on May 30, 2007, now Pat. No. 7,808,484.

(60) Provisional application No. 60/885,915, filed on Jan. 21, 2007.

(51) Int. Cl.
*G09G 5/08* (2006.01)

(52) U.S. Cl. ........ 345/163

(58) Field of Classification Search ......... 345/157, 345/163–167; 715/701–702; 463/37
See application file for complete search history.

(56) References Cited

U.S. PATENT DOCUMENTS

| | | | |
|---|---|---|---|
| 5,006,836 A | 4/1991 | Cooper |
| 5,122,785 A | 6/1992 | Cooper |
| 5,287,089 A | 2/1994 | Parsons |
| 5,379,053 A | 1/1995 | Steinberg |
| 5,717,610 A | 2/1998 | Baba |
| 5,923,318 A | 7/1999 | Zhai et al. |
| 6,094,190 A | 7/2000 | Kodim |
| 6,104,383 A | 8/2000 | Shipman |
| 6,195,085 B1 | 2/2001 | Becker et al. |
| 6,323,843 B2 | 11/2001 | Giles et al. |
| 6,362,811 B1 | 3/2002 | Edwards et al. |
| 6,377,244 B1 | 4/2002 | Reid et al. |
| 6,417,837 B1 | 7/2002 | Baba |
| 6,441,805 B1 | 8/2002 | Reid et al. |
| 6,599,259 B2 | 7/2003 | Muir |
| 6,828,958 B2 | 12/2004 | Davenport |
| 6,853,365 B2 | 2/2005 | Reid et al. |
| 6,922,186 B2 | 7/2005 | Whitcomb |
| 6,937,227 B2 | 8/2005 | Qamhiyah et al. |
| 7,063,321 B2 | 6/2006 | Hussaini et al. |
| 7,154,475 B2 | 12/2006 | Crew |
| 7,535,458 B2 | 5/2009 | Farag et al. |
| 7,683,883 B2 | 3/2010 | Touma et al. |
| 2004/0189606 A1 | 9/2004 | Powpong |
| 2006/0274042 A1 | 12/2006 | Krah et al. |
| 2007/0139376 A1 | 6/2007 | Giles |

*Primary Examiner* — Abbas Abdulselam

(57) ABSTRACT

Cursor control device for controlling a cursor on a computer screen includes a base having a flat lower surface to enable it to be movable over a horizontal surface, a pliable casing defining an interior, and a fluid-containing bladder arranged inside the casing interior and to change its shape upon application of pressure to an outer surface of the casing. When a user grasps the casing in their hand and squeezes it, the casing and the bladder change their shape. A mechanism is arranged in connection with the base for responding to the change in shape of the bladder and generating signals for control of a cursor based thereon. One embodiment of the mechanism may include a switch which can extend upward from the base through a channel in the casing so that the bladder enters into this channel as it changes its position and thereby actuates the switch.

20 Claims, 9 Drawing Sheets

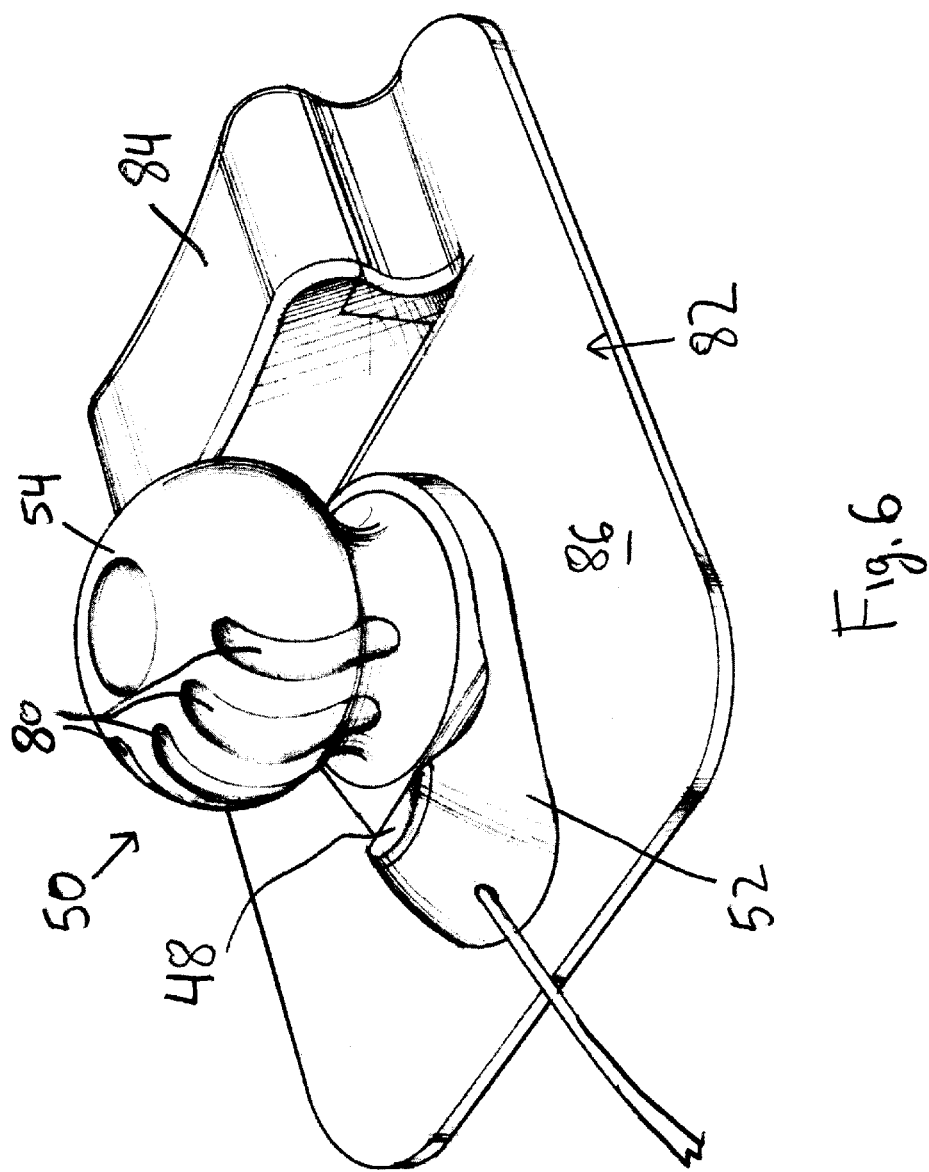

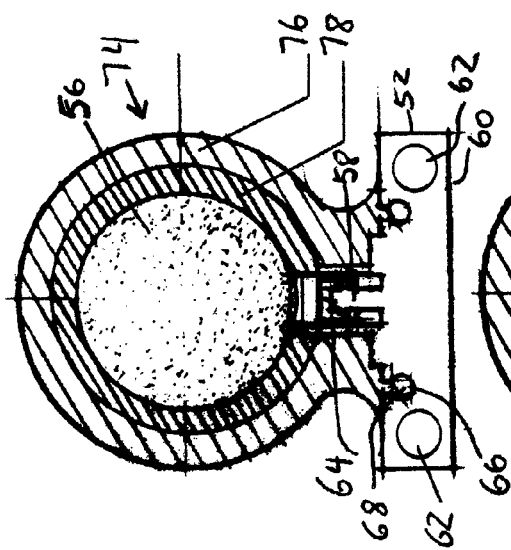
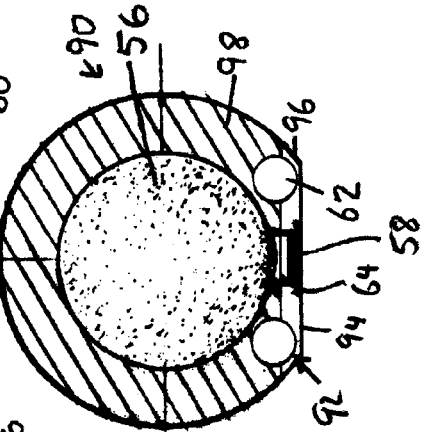
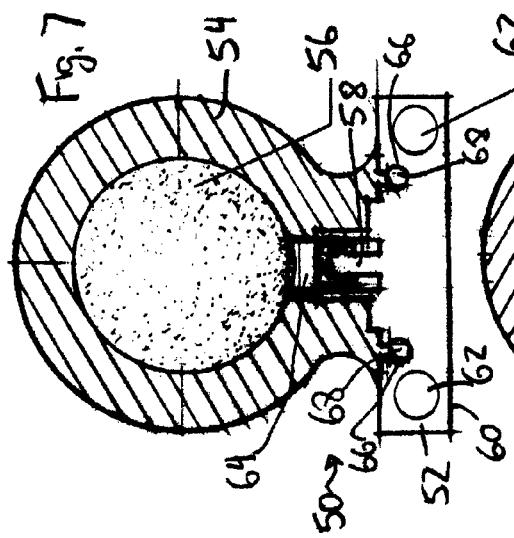
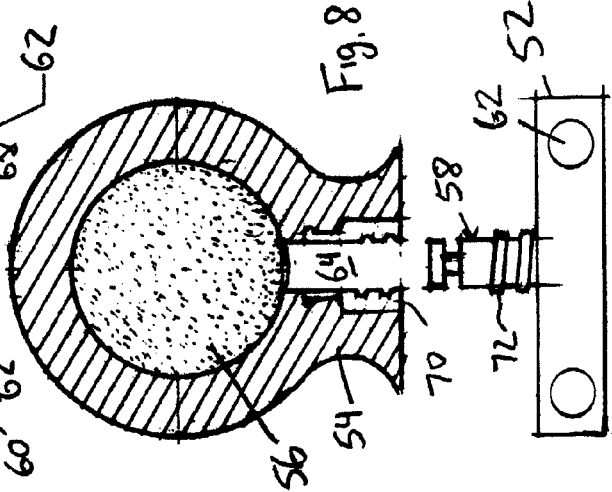

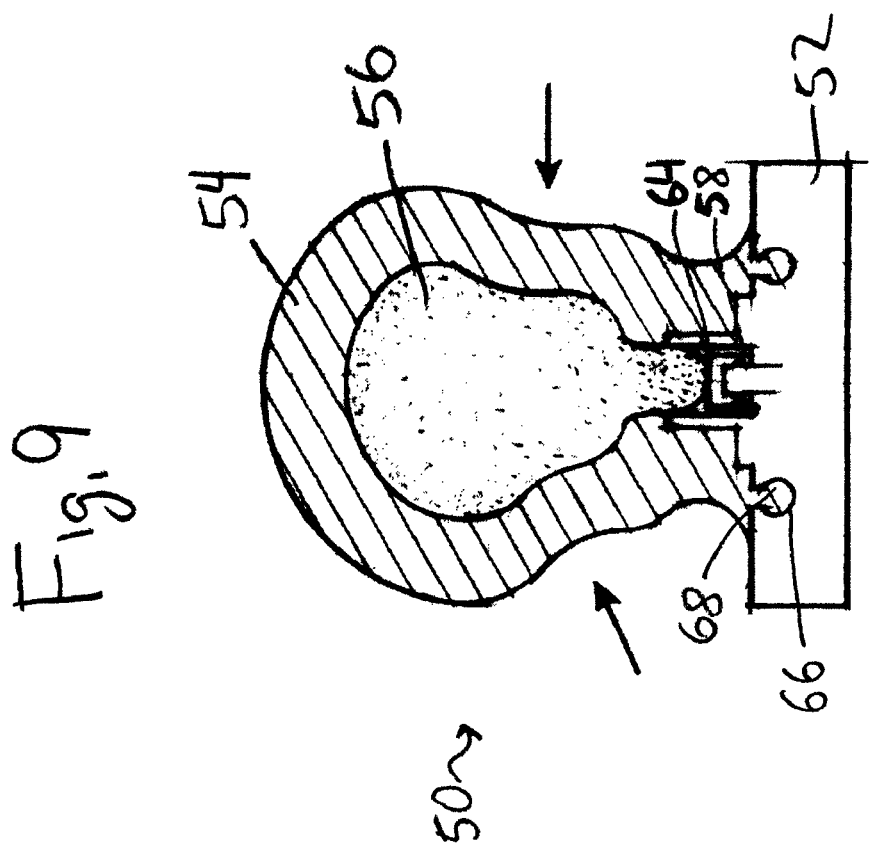

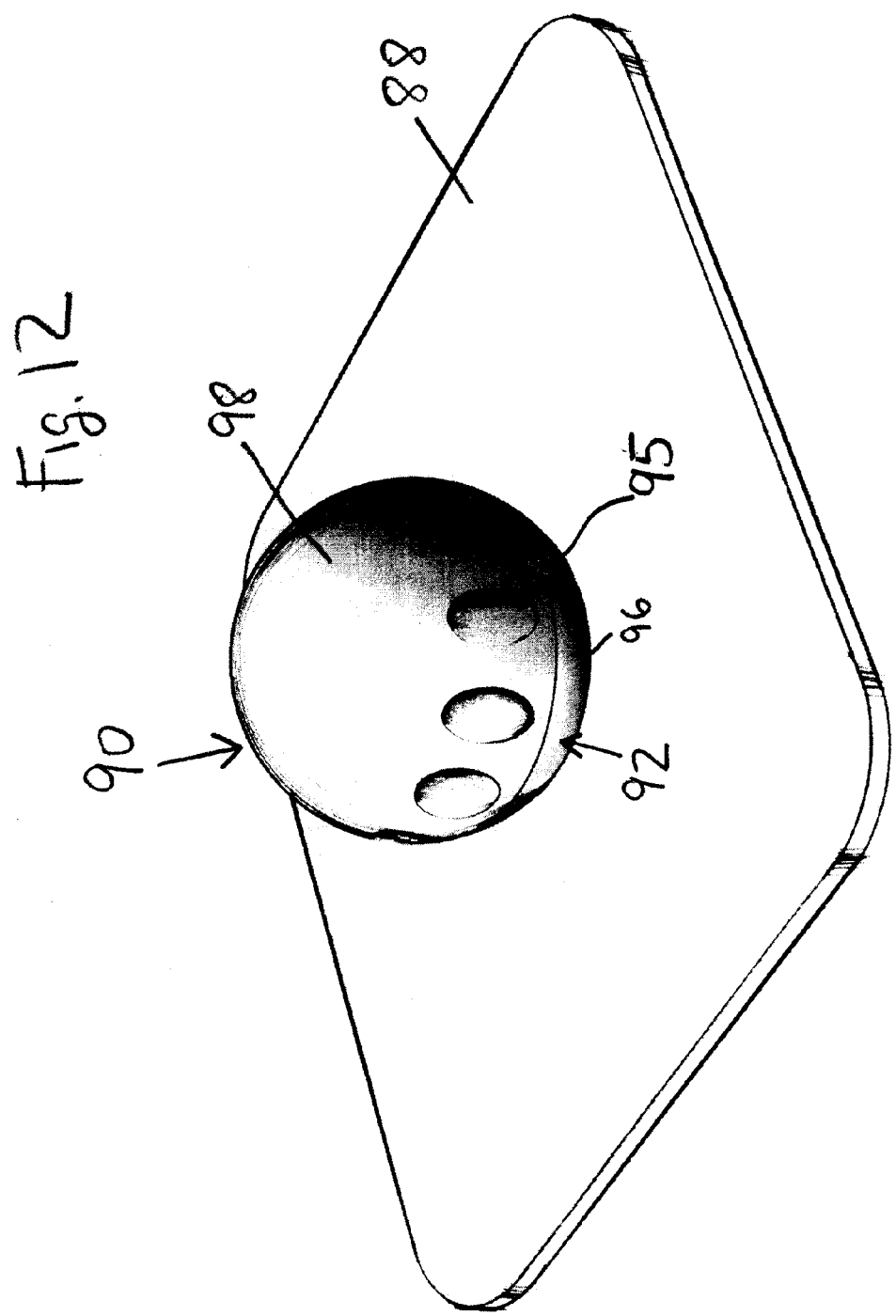

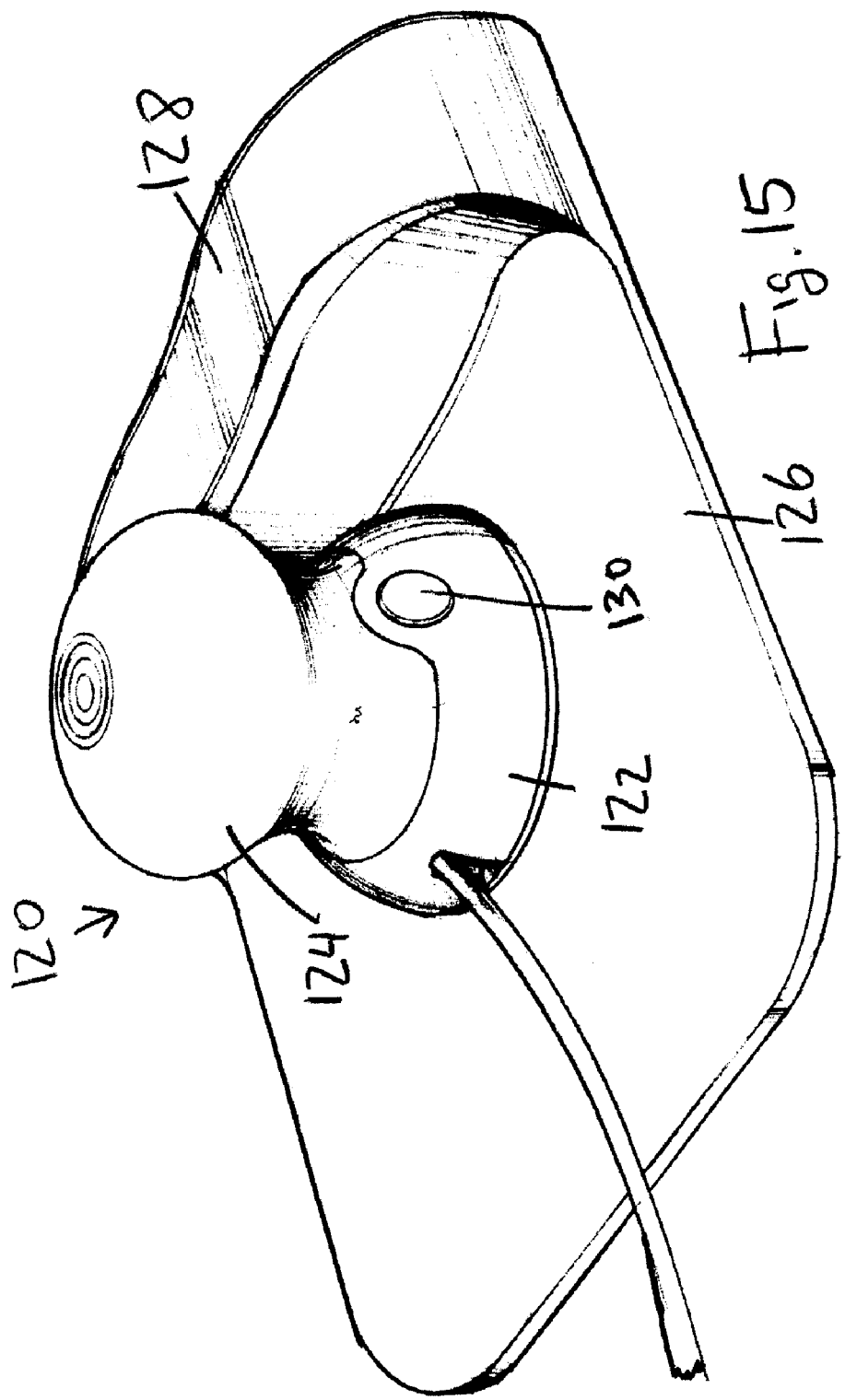

SQUEEZABLE COMPUTER MOUSE

CROSS-REFERENCE TO RELATED APPLICATION

This application is a continuation-in-part of U.S. patent application Ser. No. 11/755,058 filed May 30, 2007, which claims priority under 35 U.S.C. §119(e) of U.S. provisional patent application Ser. No. 60/885,915 filed Jan. 21, 2007, both of which are incorporated by reference herein.

FIELD OF THE INVENTION

The present invention relates generally to a device for controlling a cursor on a computer screen and more particularly to a computer mouse capable of controlling actuation of functions graphically represented on the computer screen.

BACKGROUND OF THE INVENTION

A very common way to navigate on a computer screen or display is by using a cursor control device commonly referred to as a computer mouse, which controls a cursor or other indicator on the screen or display. A computer mouse is typically grasped by the user's hand and includes one or more buttons which are depressed by one of the user's fingers, usually the pointer finger, to create a "click". A "click" is transformed into a signal by the mouse and directed to the computer where it may be associated with a function graphically represented at the location at which the cursor is located, or used to perform other screen manipulating functions. Often there are two buttons on the mouse associated with internal switches, one for a left "click" and one for a right "click".

When using a computer mouse, the user's forearm is relaxed at a horizontal position on a flat surface and most of the muscles of the hand are not utilized. Usually, the mouse is twisted from side to side, mainly using the wrist, and squeezing or griping the mouse between the thumb and little finger. Consequently, it would be desirable to enable use of a computer mouse to provide exercise for the user and/or better blood circulation. In this manner, the user would be exercising or obtain the benefits of better blood circulation while engaged in a normal work activity. The user will work with an open, relaxed hand posture which will foster the use of the entire arm and all fingers.

OBJECTS AND SUMMARY OF THE INVENTION

It is a general object of the present invention to provide a new and improved cursor control device.

It is another object of one or more embodiments of the present invention to provide a new and improved cursor control device which enables a user to improve the muscular skeleton strength of their hand and/or offer better blood circulation.

In order to achieve one or both of these objects and possibly others, a first embodiment of a cursor control device in accordance with the invention includes a base having a substantially flat lower surface to enable it to rest on and be movable over a horizontal surface, a pliable casing defining an interior, and a fluid-containing bladder arranged inside the interior of the casing and which is arranged to change its shape upon application of pressure to an outer surface of the casing. Thus, when a user grasps the casing in their hand and squeezes the casing, the casing and thus the bladder change their shape. A mechanism is arranged in connection with the base for responding to the change in shape of the bladder and generating signals for control of a cursor based thereon. One embodiment of the mechanism may include a switch which can extend upward from the base through a channel in the casing so that the bladder enters into this channel as it changes its position and thereby actuates the switch. By forming a squeezable cursor control device, a user unavoidably exercises their hands while using the device to control a computer. Thus, a form of exercise is created which is easily performed and provides significant medical benefits to the user.

Other and further objects, advantages and features of the present invention will be understood by reference to the following specification in conjunction with the annexed drawings.

BRIEF DESCRIPTION OF THE DRAWINGS

The invention, together with further objects and advantages thereof, may best be understood by reference to the following description taken in conjunction with the accompanying drawings wherein like reference numerals identify like elements.

FIG. 6 is a perspective view of a second embodiment of a cursor control device in accordance with the invention shown on a mouse pad having a wrist support portion.

FIG. 7 is a cross-sectional view of the cursor control device shown in FIG. 6.

FIG. 8 is a cross-sectional view of a modified embodiment of the cursor control device shown in FIG. 6 wherein a manipulated portion is separable from a base.

FIG. 9 is a view showing the use of the cursor control device during manipulation by a user.

FIG. 10 is a cross-sectional view showing another modified embodiment of the cursor control device shown in FIG. 6.

FIG. 11 is a cross-sectional view showing a third embodiment of a cursor control device in accordance with the invention.

FIG. 12 is a perspective view of the cursor control device shown in FIG. 11 on a mouse pad.

FIG. 15 is a perspective view of a sixth embodiment of a cursor control device in accordance with the invention shown on a mouse pad having a wrist support portion.

DETAILED DESCRIPTION OF THE INVENTION

Figure 1:
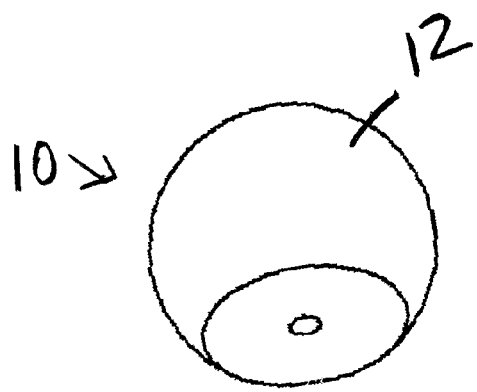
FIG. 1 is a bottom perspective view of a first embodiment of a cursor control device in accordance with the invention.
Figure 2:
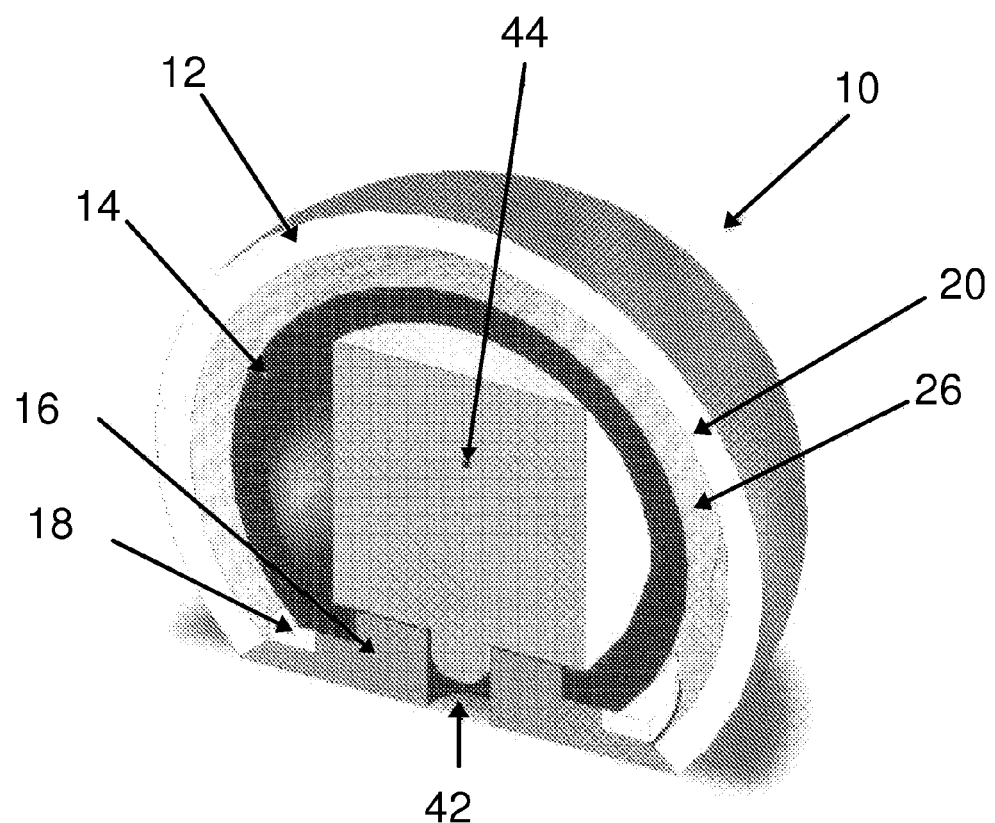
FIG. 2 is a cross-sectional view of the cursor control device in accordance with the invention shown in FIG. 1.

Referring to the accompanying drawings wherein like reference numbers refer to the same or similar elements, FIG. 1 is a perspective view of a cursor control device or computer mouse in accordance with the invention which is designated generally as 10. The cursor control device 10 includes an outer substantially spherical casing 12 lacking a lower portion (see FIG. 3), an inner substantially spherical casing 14 also lacking a lower portion (see FIG. 4), a base 16 engaging with and supporting the outer and inner casing 12, 14 and a ring 18 arranged in connection with the base 16 (see FIG. 2). The outer and inner casing 12, 14 are engaged with the base 16 to be at a distance from one another in a rest position such that there is a space therebetween, as shown in FIG. 2.

Outer casing 12 may be made of a flexible material and is provided with a conductive mesh 20 on an inner surface. For example, outer casing 12 may be made of an elastomeric material, such as rubber, or a progressive resistance material. Regardless of the material from which the outer casing 12 is made, it preferably should be sufficiently resilient to enable it to return to its original shape when an applied force is no longer present. If made from an elastomeric material, the material does not have to have a uniform composition throughout the outer casing 12 but rather, different portions of the outer casing 12 can have different properties of elasticity.

Figure 3:
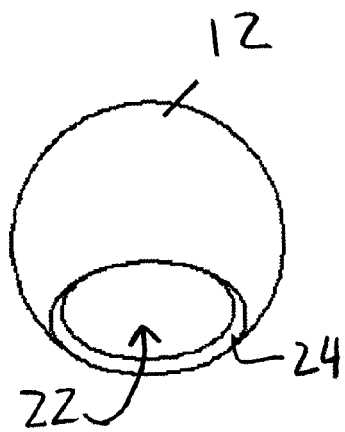
FIG. 3 is a bottom perspective view of an outer casing in the cursor control device in accordance with the invention shown in FIG. 1.

Mesh 20 may be made of a conductive metallic material. Preferably, the conductive mesh 20 is formed in such a manner to enable the entire outer casing 12 to maintain its flexibility. As shown in FIG. 3, an opening 22 at the lower portion of the casing 12 is formed with an angled surface 24 which contacts an angled surface of the base 16 and is supported thereby.

Figure 4:
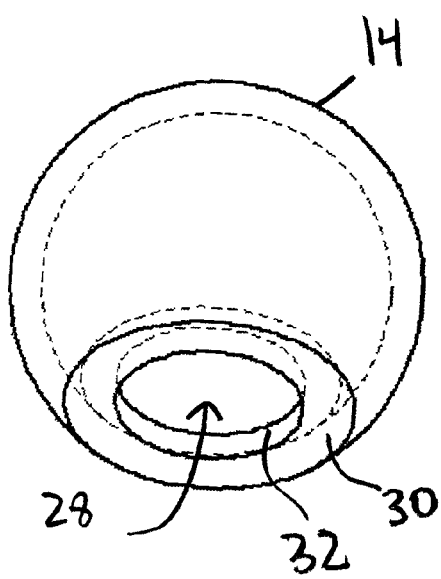
FIG. 4 is a bottom perspective view of an inner casing in the cursor control device in accordance with the invention shown in FIG. 1.

Inner casing 14 may be made of a rigid or hard material such as plastic and is provided with a coating or covering 26 on its outer surface. This covering 26 may be a conductive substrate or conductive mesh, e.g., made of a conductive metallic material. As shown in FIG. 4, an opening 28 at the lower portion of the casing 14 is formed with a flat surface 30, i.e., extending in a flat plane, such that the inner casing 14 contacts a flat surface of the base 16 and can be supported thereby. A thread is formed on a peripheral surface 32 of the inner casing 14 defining the opening 28 to enable the inner casing 14 to be secured to the base 16.

Figure 5:
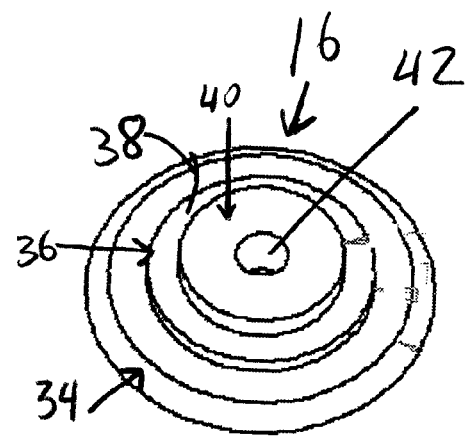
FIG. 5. is a bottom perspective view of a base in the cursor control device in accordance with the invention shown in FIG. 1.

Referring to FIG. 5, the base 16 preferably has a unitary or integral form and includes three different cross-sectional portions. A first, lowermost portion 34 is annular and has a flat, substantially circular lower surface and a substantially circular upper surface having a smaller diameter than the lower surface whereby the peripheral surface of the first portion tapers inward from the lower surface to the upper surface. The second, intermediate portion 36 is also annular and has a substantially uniform diameter which is less than the diameter of the upper surface of the lowermost portion 34. Since the intermediate portion 36 has a smaller diameter than the diameter of the upper surface of the lowermost portion 34, a support ledge 38 is formed by the upper surface of the lowermost portion 34 which supports the ring 18. The third, uppermost portion 40 is also annular and has a substantially uniform diameter smaller than the diameter of the intermediate portion 36. As such, part of the upper surface of the intermediate portion 36 is exposed and receives and supports the inner casing 12 thereon. In view of the annular structure of the three portions 34, 36, 40 of the base 16, there is an aperture 42 leading to the bottom of the base 16, the purpose of which is explained below. The exact form of the base 16 and its various portions is not limited to those described and can be varied as desired by the designer.

A thread is formed on the outer peripheral surface of the uppermost portion 40, e.g., a male thread if the inner casing 14 is provided with a female thread on the peripheral surface 32 thereof defining the opening 28 at the lower portion thereof. Instead of cooperating threads on the inner casing 14 and base 16, other cooperating mechanisms to enable the inner casing 14 to securely and removably or permanently engage with the base 16 are also envisioned to be within the scope and spirit of the invention.

The ring 18 may be an integral annular structure or alternatively, may be comprised or two halves connected together. In the latter case, the halves may be provided with an appropriate attachment mechanism to enable them to be connected together, for example, snapped together. Each half is designed to be connected to opposite ends of the conductive mesh 20 which lines the inner surface of the outer casing 12.

The ring 18 is connected to the mesh 20 and thus one function of the ring 18 is to provide a structural connection between the outer casing 18 and the rest of the cursor control device 10. Also, the ring 18 should be made of an at least partially if not completely conductive material, e.g., a conductive metal, to thereby provide a conductive link between the outer casing 12 and the internal, electrical structure, i.e., the conductive covering 26 on the inner casing 14. As an alternative to being entirely conductive, the ring 18 may include conductive paths to enable such a conductive link to be formed. The inner casing 14 may overlie and rest on the ring 18 as shown in FIG. 2.

Cursor control device 10 also includes hardware 44 which is preferably arranged inside the inner casing 14. Hardware 44 may be supported on or by the inner casing 14 and/or the base 16 and includes conventional structure to enable the movement of the cursor control device 10 relative to a surface on which it is being moved to be recognized. This structure may be optical, i.e., by emission and reception of a beam through the aperture 42, or mechanical. Hardware 44 is also arranged to transform any contact between the conductive mesh 20 on the inner surface of the outer casing 12 and the conductive covering 26 on the outer surface of the inner casing 14 into an electric signal indicative of a cursor control command, such as a "clicking" of the cursor control device 10. This contact may result in the closure or completion of a circuit including the conductive mesh 20 and conductive covering 26 which is detected by hardware 44. Alternatively, the contact can result in the opening of a circuit including the conductive mesh 20 and conductive covering 26 which is detected by hardware 44.

Hardware 44 is protected from damage by virtue of the rigidity of the inner casing 14, i.e., the user of the cursor control device 10 is prevented from squeezing and damaging the hardware 44 since the user can squeeze the cursor control device 10 only until the outer casing 12 is pressed against the inner casing 14. Although the illustrated embodiment shows the inner casing 14 as being spherical, it may alternatively be a solid structure with the hardware 44 paced into one or more cavities therein. In this case, the outer surface of such a solid structure should preferably conform to the general shape of the inner surface of the outer casing 12.

In use, the cursor control device 10 functions very similar to a conventional wireless computer mouse in that it is wirelessly connected to a computer via the hardware 44 and appropriate communications hardware and software in the computer. (Nevertheless, it is also envisioned that a wire could be provided leading from hardware 44 to the computer.) Hardware 44 is thus capable of processing movement of the device 10 relative to its supporting surface and sending a signal indicative of this movement to the computer to enable the computer to move the position of an indicator or cursor on a screen associated with the computer.

Ideally, a user will grasp the device 10 with their palm and all of their fingers against the device 10. When the user wants to execute a function graphically depicted on the screen, the user positions the cursor at a specific location by moving the device 10 and then presses the outer casing 12 inward until resistance is felt indicating that the outer casing 12 is against the inner casing 14, and then releases or maintains the pressure. The magnitude of the pressure being applied must exceed a pre-determined amount to be considered a squeeze. This pre-determined amount can either be implemented by constructing the sensor arrangement, i.e., the system which senses contact between the conductive mesh 20 and the conductive covering 26, to detect only contact arising from pressure applied to the outer casing 12 which is above a threshold, or by arranging the hardware 44 to monitor the application of pressure being applied to the outer casing 12 and generate a signal only when the pressure is determined to be above a threshold.

Contact between the outer and inner casings 12, 14 causes completion of a circuit which is detected by the hardware 44, which is interpreted as a "click" when lasting for a pre-determined amount of time and followed by absence of contact indicative of a release of pressure. This causes hardware 44 to generate a signal indicative of this "click" and send the signal to the computer. Contact between the outer and inner casings 12, 14 is interpreted as a "scroll down" motion when continuous contact is detected, i.e., when the pressure is maintained more than a pre-determined amount of time, and a signal is generated by hardware 44 and sent to the computer indicative of this "scroll down" motion.

In one embodiment, scrolling or throttle activity can be achieved by using a strain gauge that measures the change in electrical or mechanical properties whereby a desired level of scroll or throttle can be detected based on the change in electrical or mechanical properties. Thus, the user would apply different pressure to the outer casing 12 to cause different duration of scrolling and throttling.

A "double-click" indication can be created using cursor control device 10 simply by performing two "click" motions. To differentiate between two independent "clicks" and a "double-click", the pre-determined time period between sequential clicks can be regulated as desired so that, for example, a time difference less than the pre-determined time period is indicative of a "double-click" and a time difference greater than or equal to the pre-determined time period is indicative of two "clicks".

Text selection using cursor control device 10 can be accomplished by squeezing the outer casing 12 against the inner casing 14 in combination with movement of the device 10.

In one embodiment of the cursor control device 10 wherein there is a fluid between the outer and inner casings 12, 14 (e.g., air or a gel) and the hardware 44 is arranged in the base 16, the inner casing 14 is not made of a rigid or hard material and therefore does not act as a stopper against the inward pressing by the user during use. Rather, in such an embodiment, although a click between outer and inner casings 12, 14 would be generated based on contact between the conductive mesh 20 on the outer casing 12 and the covering 26 on the outer surface of the inner casing 14, the user would still be able to continue applying pressure into the fluid in order to exercise the hand. This allows the user to be able to click without an exercise and with an exercise leaving it as a controllable option. There is no issue of damaging the hardware 44 since the hardware 44 is situated in the base 16 and thus not affect by the continued inward pressing of the outer casing 12 against the inner casing 14. By contrast in the embodiment shown in FIGS. 1-5, the inner casing 14 should have some rigidity to resist inward pressure and thereby prevent damage to the hardware 44 therein.

An advantage obtained by the cursor control device 10 is that the user is performing a hand resistance exercise while using the computer. Since a significant number of people use computers continually either at work or at home, the cursor control device 10 thereby provides an unobtrusive way for these people to exercise their hands. This particular application could not only benefit the general public but also play a role for patients requiring hand physical therapy. Moreover, children who might not have the attention span to use a simple hand therapy device could now interact with a computer or other type of visual display device using the apparatus while engaged unconsciously in a strengthening exercise.

The invention thereby facilitates hand resistance training which is a form of strength training in which each effort is performed against a specific opposing force generated by elastic resistance (i.e., resistance to being stretched or bent). Exercises are isotonic if a body part is moving against the force. Exercises are isometric if a body part is holding still against the force. By utilizing a spherical or any concentric shape made from a type of material that creates resistance and maintains it, the user can create the two different exercises. Specific examples include when a user wants to simulate the "click", she will squeeze the outer casing 12 against the inner casing 14 using all the muscles in her left or right hand followed by a release of pressure, which essentially creates an isotonic exercise; and when a user wants to simulate the "scroll down" motion, she will squeeze the outer casing 12 against the inner casing 14 and hold the outer casing 12 in this position which will create an isometric exercise. Another very common task among computer users is a "double click" which, as noted above, could be simulated by a double squeeze of the outer casing 12 against the inner casing 14, i.e., a squeeze followed by a release and then another squeeze followed by a release where the time between each squeeze is predetermined.

In one embodiment, pressure applied to different portions of the outer casing 12, causing contact with the inner casing 14, can be interpreted to constitute different desired actions. For example, a right-click could be simulated by applying force only on the top of the outer casing 12, with an absence of force at other portions of the outer casing. This will introduce a separate, small area contact between the inner surface of the outer casing 12 and the outer surface of the inner casing 14. Alternatively, the right-click might be simulated by applying force only to a right side of the outer casing 12. Since the natural hand squeeze is around the sphere, i.e., around the entire outer casing 12, it is possible to correlate the application of force or pressure applied to only portions of the outer casing 12 to specific intended cursor actions.

Resistance exercise, such as made possible when using the cursor control device 10 in accordance with the invention, is optimally used to develop the strength and size of skeletal muscles. Properly performed, strength training can provide significant functional benefits and improvement in overall health and well-being including increased bone, muscle, tendon and ligament strength and toughness, improved joint function, and reduced potential for injury. An attendant benefit of the use of the cursor control device 10 in accordance with the invention is better blood circulation. Moreover, since the cursor control device 10 fosters a full hand exercise, it may also alleviate repetitive strain injury arising from a computer user's use of a conventional computer mouse.

It is envisioned that different cursor control devices 10 will be formed requiring different levels of compressive force to enable their use. The required level of compressive force can be regulated by appropriate selection of the material and dimensions of, for example, the outer casing 12. To differentiate between different devices 10 requiring different levels of compressive force, the outer casing 12 of the devices may be colored or otherwise marked differently. Additionally, the dimensions of the space between the outer and inner casings 12, 14 can be adjusted to vary the required squeezing force to effect contact between the conductive mesh 20 on the outer casing 12 and the conductive covering 26 on the inner casing 14. One or more apertures can be provided in the outer casing 12 or base 16 leading from the ambient atmosphere to this space and the size of the aperture(s) varied to thereby enable regulation of the required compressive force to effect contact between the conductive mesh 20 and the conductive covering 26. In this embodiment, air would exit from the space with each squeeze and return once pressure is released.

It is also envisioned that when hand resistance exercise is needed, e.g., for patients requiring physical therapy for their hands, interactive games could be designed for the computer or other display device associated with the cursor control device 10. These games could require specific actions to be performed using the cursor control device 10, namely numbers and patterns of squeezes, in order to cause the user to exercise their hand without consciously recognizing they are exercising.

The dimensions of the cursor control device 10 may be selected based on commercial standards for a computer mouse. The cursor control device 10 ideally should be able to be easily grasped by a typical user such that all of the user's fingers can squeeze the device while the user's palm surrounds the device. Different sizes of the cursor control device 10 can also be formed for use by people with different physical characteristics, i.e., hand size.

Although outer and inner casings 12, 14 are described above as being substantially spherical, any other concentric shapes can also be used in the invention. One factor to consider when selecting the shape of at least the outer casing 12 is ergonomics. On the other hand, to provide a distinctive yet still effective device, the outer casing could be in the form of a flexible figurine with an inner casing having a form substantially conforming to the form of the figurine but smaller to enable it to be situated inside of the outer casing while maintaining a space between the inner and outer figurine-shaped casings. Such a cursor control device would be an elongated device and could be used in either a horizontal orientation or vertical orientation.

In the embodiment of the cursor control device 10 described above, a squeeze is detected based on contact between the conductive mesh 20 of the outer casing and the conductive covering 26 on the inner casing 14. Alternative sensor arrangements are envisioned to detect a squeeze. Basically, the sensor arrangement should be able detect an inward movement of the outer casing 12 relative to the inner casing 14 or squeezing movement of the outer casing 12, with the inner casing 14 limiting the inward or squeezing movement. An alternative sensor arrangement is a strain gage system which is arranged in or on the outer casing 12 or alternatively, in or on the inner casing 14. The strain gage arrangement may be designed to convert mechanical motion of the outer casing 12 or simply pressure applied to the outer casing 12 (which is thus not required to be made of a flexible material) into a signal indicative of a squeeze, i.e., when the characteristics of the mechanical motion satisfy certain criteria. A change in capacitance, inductance or resistance is proportional to the strain experienced by the sensor arrangement and this change could be converted into an indication of the type of action the user desires to perform on the screen associated with the computer connected to the device. The hardware inside the inner casing would be coupled to this sensor arrangement and provided with the appropriate means to communicate with the sensor arrangement and convert measurement by the sensor arrangement into indications of the user's desired actions.

Cursor control device 10 can also be used solely for exercise, without its movement and application of pressure to the outer casing 12 causing motion of a cursor on a screen of a computer and effecting of commands via the computer. Specifically, if the cursor control device is picked up and elevated above the substrate on which it is normally used, then there would not be any reflection of light from the substrate which enables control of the cursor on the screen. Therefore, the hardware 44 in the cursor control device will not process any signals. The user can exercise with the cursor control device without inadvertently causing operation of the computer.

Referring now to FIGS. 6-9, another embodiment of a cursor control device in accordance with the invention is shown and designated generally as 50. Cursor control device 50 includes a base 52, a pliable covering or casing 54 and a bladder 56 containing a fluid arranged inside a cavity defined by the casing 52. Cursor control device 50 also includes a switch 58 which is arranged on the base 52 and connected to electronic components in the base 52, e.g., one or more printed circuit boards, which convey an indication of the status of the switch 58 to a computer with which the cursor control device 50 is being used.

Base 52 has a substantially planar lower surface 60 to enable it to comfortably rest on a horizontal surface of use, such as a mouse pad or equivalent. In one embodiment, base 52 can include a mechanism (not shown) which senses movement of the base 52 along the horizontal surface of use such as a mouse pad, with this movement being conveyed to the computer through a cable or wirelessly as known to those skilled in the art. Such a mechanism may be an optical sensor which directs optical waves downward against the horizontal surface of use. Indeed, a preferred use of the cursor control device 50 is to place it on a horizontal surface and move it along the horizontal surface. Thus, the cursor control device 50 would be fundamentally different from a cursor control device which provides for movement in six-degrees of freedom.

Base 52 can also include one or more compartments which removably or permanently receive one or more batteries 62. The batteries 62 are connected to the switch 58 and electronic components to provide electricity for the switch 58 and electronic components to function.

The form and shape of the base 52 shown in FIG. 6 is not limiting and any form and shape of a base is envisioned.

A button 48 is provided on the base 52, in any conventional manner, and can act as a right-click button, or other user-selectable function for a button.

Casing 54 may be made of any material which can transfer a force applied to its outer surface to the fluid-containing bladder 56, e.g., a flexible material. Such materials include elastomeric materials, such as rubber, and a progressive resistance material. The casing 54 may be a thermoplastic elastomer compound and the bladder 56 may include a combination of silicon gel, foamed elastomer and/or air. Foam offers fast snap back action and gel offers less. Regardless of the material from which the casing 54 is made, it preferably should be sufficiently resilient to enable it to return to its original shape when an applied force is no longer present. If made from an elastomeric material, the material does not have to have a uniform composition throughout the casing 54 but rather, different portions of the casing 54 can have different properties of elasticity. Also, the thicker the skin of the casing 54, the faster snap back. One skilled in the art would readily understand from the disclosure herein how to select the materials and properties of the casing 54 and bladder 56 to enable the functionality of the cursor control device 50.

Casing 54 defines a channel 64 at a bottom portion into which the switch 58 extends. The channel 64 also communicates with the interior space defined by the casing 54 in which the bladder 56 is arranged. Casing 54 may be fixed to the base 52, e.g., via any conventional structure known to those skilled in the art. As shown in FIG. 7, this mechanism may be the formation of an annular channel 66 in the base 52 and the formation of an annular projection 68 on the casing 54 which is forcibly urged into the channel 66 in the base 52.

In an embodiment wherein the casing 54 is designed to be replaceable shown in FIG. 8, a threaded portion 70 is connected to the casing 54 to partly form the channel 64 and enable the casing 54 to be releasably engaged with the switch 58, which is also formed with a threaded portion 72. Threaded portion 70 may be formed separate from or integral with the casing 54. In this embodiment, a user wanting to replace the casing 54, e.g., with another casing having a different stiffness, would turn the casing 54 relative to the base 52 to separate the casing 54 from the base 52. The new casing 54 would then be screwed onto the base 52 via the cooperating threaded portions 70, 72. Instead of threaded portions on the casing 54 and the switch 58, other means for providing a cooperating releasable attachment mechanism of the casing 54 to the switch 58 may also be provided. Alternatively, means for providing a cooperating releasable attachment mechanism of the casing 54 directly to the base 52 may be provided.

The bladder 56 contains a fluid such as air or in a preferred embodiment, a gel. Other fluids mentioned above include silicon gel and related compounds, foamed elastomer and related compounds and/or air. The bladder 56 may be partially or completely filled with the fluid. At a minimum, the bladder 56 should be filled with the fluid such that when a predetermined minimum threshold force is applied to the casing 54, this force exerts a compressive effect on the bladder 56 and causes expansion of the bladder 56 into the channel 64 in the casing 54 and into contact with the switch 58 causing the switch 58 to be actuated (see FIG. 9 wherein the arrows represent the application of force applied to the casing 54 by the user's hand). Upon actuation, a signal is sent from the switch 58 to the computer indicative of such activation. When the applied force is subsequently less than the threshold, the bladder 56 moves out of contact with the switch 58 and the switch 58 returns automatically to its normal, unactuated state, causing an indication thereof to be sent. This indication may either be a positive signal indicative of the non-actuation of the switch 58 or simply the lack of a signal indicating actuation of the switch 58.

In one embodiment, the switch 58 does not have to extend into the channel 64 but rather, may be flush with the base 52 and the bladder 58 designed to extend entirely through the channel 64 into contact with the switch 58 on the base 52. Thus, any relative arrangement of the bladder 56 and the switch 58 to enable a change in shape of the bladder 56 arising from the application of force to the outer surface of the casing 54 to cause contact between the bladder 56 and the switch 58 can be used. Instead of actual contact, an intermediate component may be situated in the channel 64 to be moved by the bladder 56 against the switch 58.

A switch 58, which is provided with an upper part which can react to the contact with and/or force exerted by the bladder 56, can easily be construct by those skilled in the sensor field. Such a switch 58 would also be provided with or coupled to appropriate electronic components to generate signals based on the contact with or force exerted by the expandable bladder 56. For example, the switch 58 may include a movable upper part which is moved downward by the expanding bladder 56 with the downward movement being considered indicative of actuation of the switch 58. Thus, switch 58 should be considerable as an example of a mechanism which responds to a change in shape of the bladder 58, whether by direct contact with a portion of the bladder 58 which is urged against the switch when the user applies pressure to the casing 54 or by indirect contact through the intermediacy of a part between the bladder and the switch 58. In the latter case, this part would be affected by the change in shape of the bladder 58 arising from the application of pressure to the outer surface of the casing 54.

As shown in FIG. 10, it is possible to provide a casing 74 having a plurality of layers 76, 78. The outermost layer 76 may be provided with the means to releasably or fixedly connect to the base 52, e.g., the annular projection 68 as shown or alternatively a threaded portion, and define a lower part of the channel 64. The innermost layer 78 is substantially spherical and has an opening forming an upper part of the channel 64. The switch 58 can extend upward from the base 52 alongside only the portion of the channel 64 defined by the outermost layer 76 or even alongside a portion of the channel 64 defined by the innermost layer 78. The exact height of the switch 58 from the base 52 would depend on several factors, including for example, the expandability of the bladder 56, the flowability of the fluid in the bladder 56, and the softness of the casing 74.

In one embodiment, the outermost layer 76 of the casing 74 is softer than the innermost layer 78. Nevertheless, the softness, pliability or rigidity of the layers 76, 78 of the casing 74 can be selected as desired.

Referring back to FIG. 6, casing 54 is optionally provided with grooves 80 on its outer surface to accommodate the fingers of the user. Further, the cursor control device 50 may be used with a mouse pad 82 having a wrist support portion 84 which is integral with or detachable from the horizontal cursor control support portion 86. In use, the cursor control device 50 would be positioned such that the grooves 80 are on an opposite side of the wrist support portion 84.

FIGS. 11 and 12 show an embodiment of a cursor control device 90 wherein the base 92 has a flat bottom surface 94 and is formed such that its circumferential side surface 96 is flush with the outer surface of a substantially spherical casing 98 which is attached to the base 92. The bottom surface 94 can therefore rest on and be movable along a horizontal surface of use 88. An optical movement detection mechanism may be housed in the base 92. A button 95 is arranged on the base 92, in any conventional manner, and can act as a right-click button, or other user-selectable function for a button. Otherwise, the same components of the cursor control device 50 are provided in cursor control device 90, e.g., a switch 58, batteries 62, the properties thereof may be the same and cursor control device 90 functions in substantially the same ways as cursor control device 50. One difference is that the compartments receiving the batteries 62 may be formed partly in the casing 98.

Figure 13:
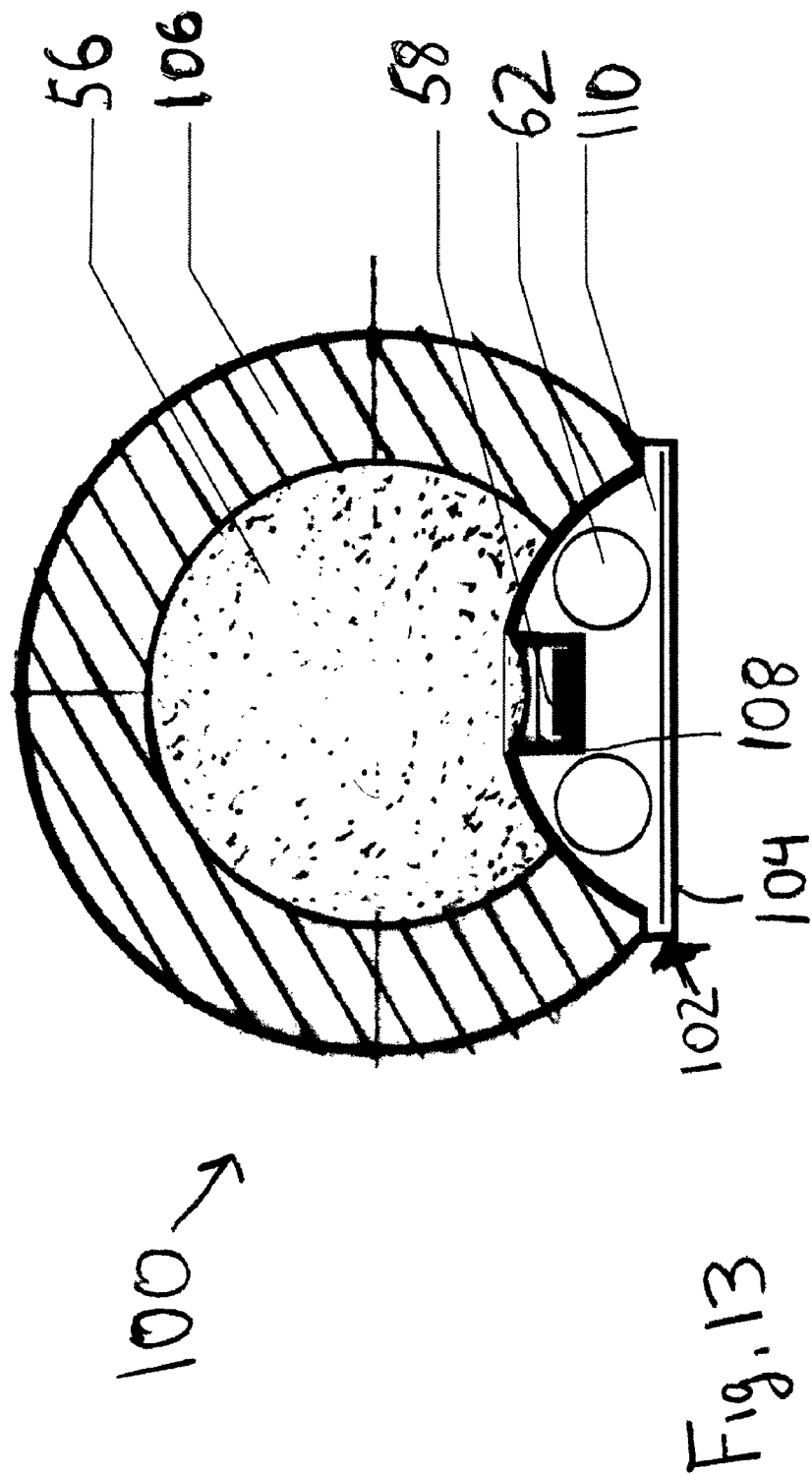
FIG. 13 is a cross-sectional view showing a fourth embodiment of a cursor control device in accordance with the invention.

FIG. 13 shows an embodiment of a cursor control device 100 which also has a base 102 having a flat bottom surface 104, and a substantially spherical casing 106 attached to the base 102. The base 102 defines a channel 108 for the switch 58, houses the batteries 62 and also houses printed circuit board or other electronic components 110 which are coupled to the switch 58 (by connecting means—not shown) and convey signals about actuation of the switch 58 to the computer to which the cursor control device 100 is connected. Otherwise, the same components of the cursor control device 50 are provided in cursor control device 100, e.g., a bladder 56, the properties thereof may be the same, and cursor control device 100 functions in substantially the same ways as cursor control device 50. The cursor control device 100 in this embodiment appears very similar to a sphere from the outside and thus does not have a visible base, as in the embodiment shown in FIGS. 11 and 12.

Figure 14:
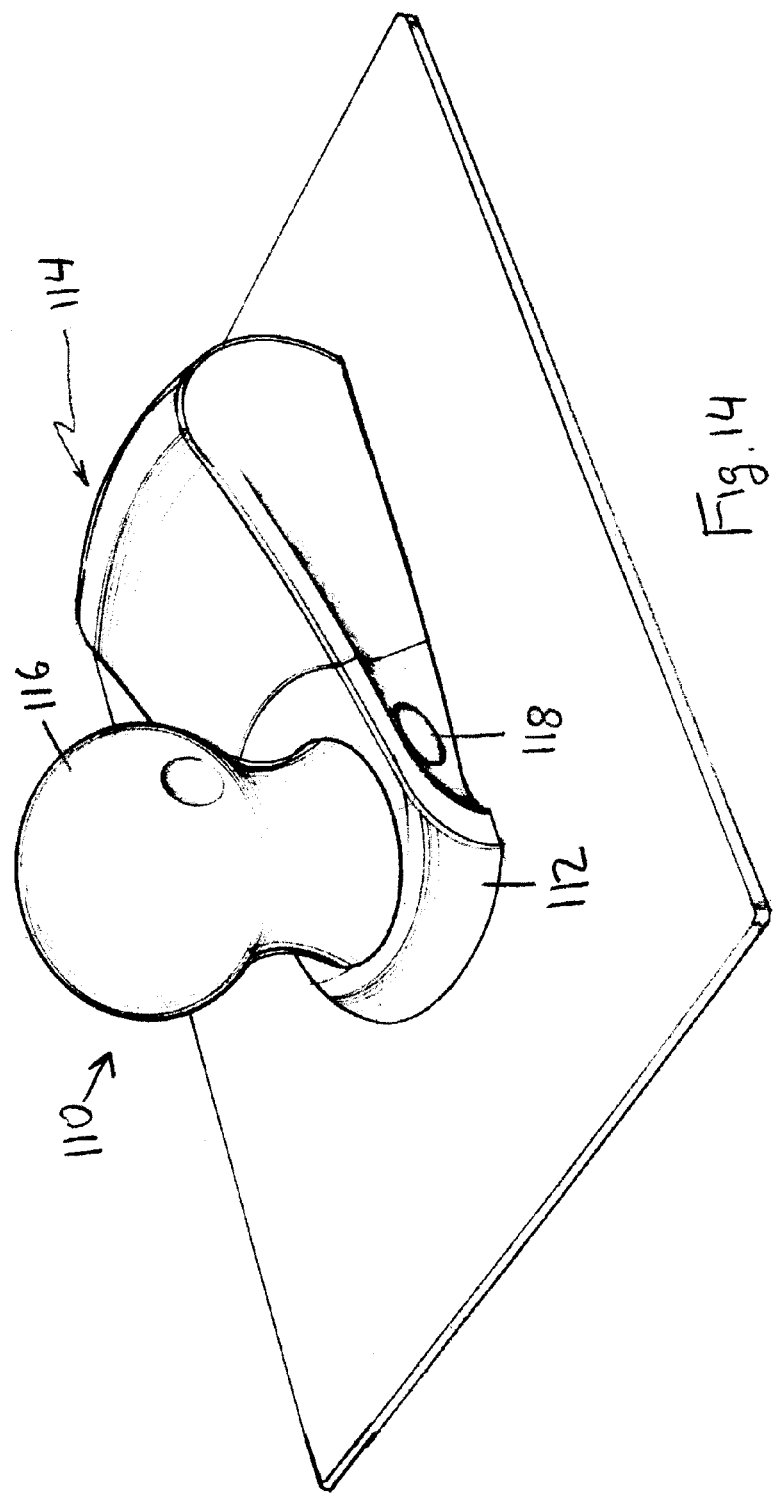
FIG. 14 is a perspective view of a fifth embodiment of a cursor control device in accordance with the invention shown with a detachable wrist pad and on a mouse pad.

FIG. 14 shows another embodiment of a cursor control device 110 in accordance with the invention having a base 112 which has a surface contour opposite to the contour of a surface of a detachable wrist pad 114. Cursor control device 110 includes a casing 116 and other internal components like the cursor control devices described above. A button 118 is arranged on the base 112, in any conventional manner, and can act as a right-click button, or other user-selectable function for a button.

FIG. 15 shows another embodiment of a cursor control device 120 in accordance with the invention having a base 122, a casing 124 and other internal components like the cursor control devices described above. In this embodiment, the mouse pad 126 has an integral wrist support portion 128 to facilitate use of the cursor control device 120. A button 130 is arranged on the base 122, in any conventional manner, and can act as a right-click button, or other user-selectable function for a button.

Additional variations to the cursor control devices described above are envisioned. In one contemplated embodiment, a fluid-containing bladder is situated inward of an outer casing (as in the embodiments shown in FIGS. 6-15), but does not occupy the center of the interior cavity formed by the outer casing. Rather, there is an inner ball inside the cavity and the bladder is interposed between the inner ball and the outer casing. This allows for the use of a smaller bladder.

The cursor control devices shown in FIGS. 6-15 may be used in a similar manner as the cursor control device shown in FIGS. 1-5. Pressing of the cursor control device would therefore cause actuation of the switch and variations in the pressing force could be converted by the switch into directional movements.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A cursor control device, comprising:
a base having a substantially flat lower surface to enable it to rest on and be movable over a horizontal surface;
a pliable casing defining an interior;
a fluid-containing bladder arranged inside the interior of said casing, said bladder being arranged to change its shape upon application of pressure to an outer surface of said casing; and
actuation means arranged in connection with said base for responding to the change in shape of said bladder and generating signals for control of a cursor based thereon.

2. The device of claim 1, wherein said bladder is arranged to contact said actuating means.

3. The device of claim 1, wherein said actuation means comprise a switch.

4. The device of claim 1, wherein said casing is made of a flexible material or a resilient, elastomeric material.

5. The device of claim 1, wherein said casing defines a channel at a bottom portion into which said actuation means extends, said bladder being arranged to enter into said channel when pressure is applied to the outer surface of said casing and thereby engage said actuation means.

6. The device of claim 1, wherein said casing is removable from said base.

7. The device of claim 1, wherein said casing includes a threaded portion and said actuation means includes a complementary threaded portion to enable said casing to be removably attached to said actuation means.

8. The device of claim 1, wherein said base includes an annular channel and said casing includes an annular projection arranged to fit into said annular channel to thereby secure said casing to said base.

9. The device of claim 1, wherein said bladder contains a gel.

10. The device of claim 1, wherein said casing includes a plurality of layers having different properties.

11. The device of claim 1, wherein the outer surface of said casing includes grooves for accommodating fingers of a user.

12. In a cursor control device including structure to enable the movement of the cursor control device relative to a surface on which it is being moved to be recognized, comprising:
a base having a substantially flat lower surface to enable it to rest on and be movable over a horizontal surface;
a resilient casing defining an interior;
a bladder arranged in the interior of said casing, said bladder including at least one fluid and being arranged to change its shape upon application of pressure to an outer surface of said casing; and
a switch arranged in connection with said base for responding to the change in shape of said bladder and generating signals for control of a cursor based thereon,
whereby after release of pressure to the outer surface of said casing, said casing changes toward its original shape.

13. The device of claim 12, wherein said bladder is arranged to contact said switch.

14. The device of claim 12, wherein said casing defines a channel at a bottom portion into which said switch extends, said bladder being arranged to enter into said channel when pressure is applied to the outer surface of said casing and thereby engage said switch.

15. The device of claim 12, wherein said casing is removable from said base.

16. The device of claim 12, wherein said casing includes a threaded portion and said switch includes a complementary threaded portion to enable said casing to be removably attached to said switch.

17. The device of claim 12, wherein said base includes an annular channel and said casing includes an annular projection arranged to fit into said annular channel to thereby secure said casing to said base.

18. The device of claim 12, wherein said bladder contains a gel.

19. The device of claim 12, wherein said casing includes a plurality of layers having different properties.

20. In a cursor control device including structure to enable the movement of the cursor control device relative to a surface on which it is being moved to be recognized, comprising:
a base having a substantially flat lower surface to enable it to rest on and be movable over a horizontal surface;
a resilient casing defining an interior and a channel at a bottom portion,
a bladder arranged in the interior of said casing, said bladder including at least one fluid and being arranged to change its shape upon application of pressure to an outer surface of said casing and enter into said channel defined by said casing; and
a switch arranged in connection with said base for responding to the entry of said bladder into said channel arising from the change in shape of said bladder and generating signals for control of a cursor based thereon,
whereby after release of pressure to the outer surface of said casing, said casing changes toward its original shape.

* * * * *